UNITED STATES PATENT OFFICE.

EUGÈNE LECONTE, OF ESTAIRES, FRANCE.

PREPARING YEAST.

SPECIFICATION forming part of Letters Patent No. 440,772, dated November 18, 1890.

Application filed September 11, 1890. Serial No. 364,655. (No specimens.) Patented in England March 11, 1890, No. 3,856, and in France March 22, 1890, No. 204,464.

*To all whom it may concern:*

Be it known that I, EUGÈNE LECONTE, a citizen of the French Republic, residing at Estaires, in France, have invented a certain new and useful Method of Treating Brewers' Yeast for use in the Preparation of Alimentary Products, (for which I have obtained Letters Patent in France, No. 204,464, dated March 22, 1890, and in England, No. 3,856, dated March 11, 1890,) of which the following is a full, clear, and exact description.

My invention has relation to a method of treating the yeast obtained during the manufacture of beer or other alcoholic products, and commonly known as "brewers' yeast," whereby its leavening properties are restored or revivified and said yeast adapted for use in the preparation of alimentary products, such as bread, pastry, and the like. It is well known that this yeast has but little leavening or fermentative properties generally, and a portion thereof is usually lost before it can be used in the preparation of alimentary products, as described, and besides, such yeast has usually a very bitter taste, which renders it unfit for the uses described, and for this reason it is generally repudiated by bakers.

It is the object of my invention to so treat said yeast that the same will have all its lost fermentative properties restored and its fermentative properties increased and a sweet taste imparted to the yeast so treated, whereby the bread or pastry will have a sweeter taste and will remain in a moist condition for a longer period of time.

My method of treatment is as follows: I mix with the yeast a sufficient quantity of water at a temperature of from 20° to 25° centigrade to make the mixture of the consistency of cream. I then add to this mixture a greater or less quantity of extract or sirup of malt or other cereal sweetened and concentrated, as well as a certain quantity of kiln-dried and peptonized flour made from horse-beans, and the whole is then thoroughly stirred to incorporate the several subtances. The mixture is then allowed to rest for a time, after which it may be used in the preparation of alimentary products in the usual manner.

I find that by the addition of the extract or sirup of malt (which is itself a generator of yeast) and the described flour (which is adapted to keep the yeast in a sweet and wholesome state) the leavening or fermentative properties of the yeast are increased and its lost fermentative properties restored or revivified, and consequently only from sixteen to twenty per cent. of the quantity usually employed need be used of the new yeast which has been thus produced.

A great advantage resulting from my treatment lies in the fact that ordinary brewers' yeast (which is often repudiated by bakers, principally on account of its little fermentative properties and bitter taste) can be utilized in place of the special yeast made for bakers' use, and the food products will be found to be considerably sweeter in taste and will keep moist for a longer period of time.

The proportions of malt sirup and flour used may vary according to the requirements of each establishment—for instance, the sirup might be considerably diluted before adding it to the yeast, and yet good results obtained, and, if desired, the flour described may be omitted, though I prefer to use it for the reasons before set forth; or in place of the malt sirup I may use a must prepared in any suitable manner, said must being combined with malt, or malt and fresh grain, the whole forming, after being filtered, a diluted extract of malt.

What I claim, and desire to secure by Letters Patent, is—

1. The method herein described of revivifying and removing the bitterness from brewers' yeast to fit the same for use in bread-making, which consists in diluting the yeast with warm water and adding maltine or extract of malt thereto.

2. The method herein described of revivifying and removing the bitterness from brewers' yeast to fit the same for use in bread-making, which consists in diluting the yeast with warm water and adding thereto maltine or extract of malt together with dried and peptonized flour of horse-beans.

In testimony that I claim the foregoing I have hereunto set my hand this 28th day of August, 1890.

EUGÈNE LECONTE.

Witnesses:
OLIVER R. JOHNSON,
*Consulate-General U. S. A., London, England.*
JOHN ABERCROMBY,
11 *Bessborough Gardens, Westminster.*